United States Patent
Xun et al.

(10) Patent No.: US 8,730,800 B2
(45) Date of Patent: May 20, 2014

(54) METHOD, APPARATUS, AND SYSTEM FOR TRANSPORTING VIDEO STREAMS

(75) Inventors: Yongsheng Xun, Nanjing (CN); Hewen Zheng, Nanjing (CN); Xia Qin, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 234 days.

(21) Appl. No.: 13/109,715

(22) Filed: May 17, 2011

(65) Prior Publication Data

US 2011/0274121 A1 Nov. 10, 2011

Related U.S. Application Data

(63) Continuation of application No. PCT/CN2009/072190, filed on Jun. 9, 2009.

(30) Foreign Application Priority Data

Nov. 17, 2008 (CN) .......................... 2008 1 0176542

(51) Int. Cl.
*H04J 1/16* (2006.01)

(52) U.S. Cl.
USPC .......................................... 370/230; 370/474

(58) Field of Classification Search
USPC ................ 375/240.01, 240.02; 709/230–242; 370/474, 235, 229, 230, 338
See application file for complete search history.

(56) References Cited

U.S. PATENT DOCUMENTS

| | | | |
|---|---|---|---|
| 5,510,844 A | 4/1996 | Cash et al. | |
| 6,498,865 B1 | 12/2002 | Brailean et al. | |
| 6,728,213 B1 | 4/2004 | Tzeng et al. | |
| 2005/0021806 A1 * | 1/2005 | Richardson et al. | 709/231 |
| 2005/0254447 A1 | 11/2005 | Miller-Smith | |
| 2007/0201365 A1 | 8/2007 | Skoog et al. | |
| 2007/0237227 A1 | 10/2007 | Yang et al. | |
| 2008/0175148 A1 | 7/2008 | Todd et al. | |
| 2009/0252219 A1 | 10/2009 | Chen et al. | |
| 2010/0034289 A1 | 2/2010 | Kim et al. | |

FOREIGN PATENT DOCUMENTS

| | | |
|---|---|---|
| CN | 1398089 A | 2/2003 |
| CN | 1505888 A | 6/2004 |
| CN | 1675931 A | 9/2005 |
| CN | 1739101 A | 2/2006 |
| CN | 101026572 A | 8/2007 |
| CN | 101077010 A | 11/2007 |

(Continued)

OTHER PUBLICATIONS

European Examination Report issued on Sep. 13, 2012 in connection with European Patent Application No. EP 09825726.4, 6 pages.

(Continued)

*Primary Examiner* — Dady Chery

(57) ABSTRACT

A method, an apparatus, and a system for transporting video streams are disclosed herein to handle video streams of different coding mechanisms and different encapsulation mechanisms intelligently according to visual sensitivity. The method includes: assessing a video data packet to gain visual sensitivity identifier information of the video data packet; adding the visual sensitivity identifier information into the video data packet; and handling the video data packet according to the visual sensitivity identifier information while transporting the video data packet. The embodiments of the present invention are applicable to transporting of network video streams.

8 Claims, 7 Drawing Sheets

(56) References Cited

FOREIGN PATENT DOCUMENTS

| EP | 0 701 376 A2 | 3/1996 |
| HK | 1027704 A1 | 4/2005 |
| JP | 8149420 A | 6/1996 |
| WO | WO 03/052612 A1 | 6/2003 |
| WO | WO 2006/064454 | 6/2006 |

OTHER PUBLICATIONS

Partial translation of Rejection Decision dated Nov. 5, 2012 in connection with Chinese Patent Application No. 200810176542.9.
Office Action dated Nov. 9, 2011 in connection with Chinese Patent Application No. 200810176542.9.
Xu Jin, et al., "Content Adaptive Redundant Slices Coding Algorithm for H.264 Video", Journal of Computer-Aided Design & Computer Graphics, vol. 19, No. 1, Jan. 2007, 11 pages.
International Search Report dated Aug. 20, 2009 in connection with International Patent Application No. PCT/CN2009/072190.
Written Opinion of the International Searching Authority dated Aug. 20, 2009 in connection with International Patent Application No. PCT/CN2009/072190.
Partial Translation of Second Chinese Office Action dated Jul. 12, 2012 in connection with Chinese Patent Application No. 200810176542.9, 19 pages.
European Search Report issued on Feb. 23, 2012 in connection with European Patent Application No. EP 09 82 5726.
Qian Chen, et al., "Application of Scalable Visual Sensitivity Profile in Image and Video Coding," IEEE International Symposium on Circuits and Systems, 2008, pp. 268-271.
"Proposal for the functional requirements of traffic control function," Huawei Technologies, Telecommunication Standardized Sector, International Telecommunication Union, Com 16-C 156-E, Jan. 2009, 2 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
|                             ....                              |
+-+-+-+-+-+-+-+-+-+-+-+-+-+-+-+-+-+-+-+-+-+-+-+-+-+-+-+-+-+-+-+-+
```

FIG. 8

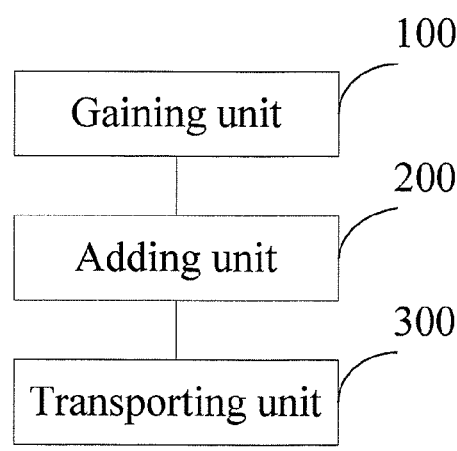

FIG. 9

METHOD, APPARATUS, AND SYSTEM FOR TRANSPORTING VIDEO STREAMS

CROSS-REFERENCE TO RELATED APPLICATIONS

This application is a continuation of International Application No. PCT/CN2009/072190, filed on Jun. 9, 2009, which claims priority to Chinese Patent Application No. 200810176542.9, filed on Nov. 17, 2008, both of which are hereby incorporated by reference in their entireties.

TECHNICAL FIELD

The present invention relates to network technologies, and in particular, to a method, an apparatus, and a system for transporting video streams.

BACKGROUND

With rapid development of network technologies, network communication services are more and more diversified. For example, Voice over IP (VoIP) Internet Protocol Television (IPTV), and High Speed Internet (HSI) are booming. Users are increasing rapidly, which brings enormous requirements for network bandwidth. Congestion occurs inevitably on bearer networks, especially on convergence networks of service providers. In the discard mechanism currently applied to IP Quality of Service (QoS) algorithm, packets are discarded randomly. When selecting the congestion packets for discarding, the discard mechanism does not consider the impact brought by the discarded messages on a receiver.

For certain data transport protocols such as Real-time Transport Protocol (TCP), when a packet is discarded, the receiver requests to retransport the lost packet. Such a mechanism is scarcely practicable to networks which perform multicast of real-time streams such as audio stream and video stream. The space of the buffer on the receiver is limited, and there is insufficient time for requesting and accepting retransported packets in the services which are highly real-time.

During IPTV video transport, the loss of different IPTV packets affects the visual experience of users rather differently. That is, visual sensitivity of end users varies with different discarded IPTV packets. The discarding of certain IPTV packets has a little impact on pictures, and is hardly perceivable by the end users; but the loss of other IPTV packets has harsh impact on pictures, for example, leading to exceptions such as dim screen, which is easily perceivable by the end users. When a network device is congested, the traditional solution is to discard packets randomly, without considering different impact caused by discarding of different IPTV packets on the screen of a receiving terminal.

A video stream includes a series of Group of Pictures (GOP). A GOP includes an I frame, multiple P frames, and multiple B frames. In the H.264-based IPTV system, the prior art puts forward an intelligent discard method based on service perception: When a network is congested and some packets have to be discarded, the network device discards packets of different frame types selectively. First, a NAL Reference Indicator (NRI) field in a Network Abstraction Layer (NAL) packet header of H.264 is detected on a Digital Subscriber Line Access Multiplexer (DSLAM); the DSLAM network node judges whether a packet needs to be discarded according to the value of NRI; if NRI is 0, it indicates that the video frame is a non-reference frame, and the congested DSLAM network node discards this packet first; when discarding packets, the DSLAM network node discards B frames first, and P frames, and finally, the I frame. If a corresponding IP packet of a frame is discarded, IP packets of the whole frame are discarded. Such a discard solution is defective in the following aspects:

(1) Limitation in the coding mechanism: The solution supports only H.264 coding, but does not support MPEG-2 coding.

(2) Limitation in the encapsulation mechanism: The solution supports only RTP-encapsulated H.264 video streams, but does not support RTP-encapsulated MPEG2 video streams or MPEG2-TS encapsulated video streams.

(3) The NRI indicates the frame type; one frame corresponds to multiple IP packets; among the multiple IP packets, discarding of only certain IP packets affect the screen of the receiving terminal. Therefore, when the NRI is used as a basis for judging whether a packet needs to be discarded, the whole frame corresponding to the NRI value is discarded, which makes the network device unable to schedule or forward the packets one by one and deteriorates user experience of the receiver.

SUMMARY

A method for transporting video streams is provided in an embodiment of the present invention to differentially handle video streams of different coding mechanisms and different encapsulation mechanisms according to visual sensitivity.

To fulfill such objectives, the following technical solution is put forward:

A method for transporting video streams includes:

assessing a video data packet to gain visual sensitivity identifier information of the video data packet;

adding the visual sensitivity identifier information to the video data packet, where the visual sensitivity identifier information indicates a degree of impact to be caused by loss of the video data packet on a screen of a terminal; and transporting the video data packet, and handling the video data packet according to the visual sensitivity identifier information during transport.

In the method for transporting video streams herein, the video data packet is assessed to gain the visual sensitivity identifier information of the video data packet; the visual sensitivity identifier information is carried in the video data packet; while the video data packet is transported, the video data packet is handled according to the identifier information. In this way, video streams of different coding mechanisms and different encapsulation mechanisms are handled intelligently according to the visual sensitivity.

A network device for transporting video streams is provided in another embodiment of the present invention to handle video streams of different coding mechanisms and different encapsulation mechanisms differentially according to visual sensitivity.

To fulfill such objectives, the following technical solution is put forward:

A network device for transporting video streams includes:

a gaining unit, configured to assess a video data packet to gain visual sensitivity identifier information of the video data packet, where the visual sensitivity identifier information indicates a degree of impact to be caused by loss of the video data packet on a screen of a terminal;

an adding unit, configured to add the visual sensitivity identifier information to the video data packet; and a transporting unit, configured to transport the video data packet and handle the video data pack according to the visual sensitivity identifier information during transport.

In the network device for transporting video streams herein, the gaining unit assesses the video data packet to gain the visual sensitivity identifier information of the video data packet; the adding unit adds the visual sensitivity identifier information to the video data packet; and the transporting unit transports the video data packet and handles the video data packet differentially according to the identifier information during transport. In this way, video streams of different coding mechanisms and different encapsulation mechanisms are handled intelligently according to the visual sensitivity when network congestion occurs.

A system for transporting video streams in an embodiment of the present invention includes:

a video source, configured to: assess a video data packet to gain visual sensitivity identifier information of the video data packet, add the visual sensitivity identifier information to the video data packet, and transport the video data packet to a network device, where the visual sensitivity identifier information indicates a degree of impact to be caused by loss of the video data packet on a screen of a terminal; and a network device, configured to receive the video data packet from the video source, and handle the video data packet according to the visual sensitivity identifier information.

Another system for transporting video streams in an embodiment of the present invention includes:

a video source, configured to transport a video data packet to a network device; and a network device, configured to: receive the video data packet from the video source, assess the video data packet to gain visual sensitivity identifier information of the video data packet, add the visual sensitivity identifier information to the video data packet, and handle the video data packet according to the visual sensitivity identifier information, where the visual sensitivity identifier information indicates a degree of impact to be caused by loss of the video data packet on a screen of a terminal.

In the system for transporting video streams herein, the video source and the network device are set; the video source or the network assesses a video data packet to gain the visual sensitivity identifier information of the video data packet, and adds the visual sensitivity identifier information to the video data packet of a video stream, or, the video source sends only the video data packet but the network device analyzes the visual sensitivity identifier information in the video data packet and handles the video data packet according to the visual sensitivity identifier information. In this way, video streams of different coding mechanisms and different encapsulation mechanisms are handled intelligently according to the visual sensitivity.

BRIEF DESCRIPTION OF THE DRAWINGS

To describe the technical solution under the present invention or the prior art more clearly, the following briefly describes the accompanying drawings involved in description of the embodiments of the present invention or the prior art. Apparently, the accompanying drawings below are illustrative rather than exhaustive. Persons of ordinary skill in the art can derive other drawings from such accompanying drawings without any creative effort.

FIG. 8 shows a schematic diagram of how to carry identifier information in an embodiment of the present invention;

FIG. 9 shows a network device for transporting video streams in an embodiment of the present invention.

DETAILED DESCRIPTION

The following expounds a method, a device and a system for transporting video streams in the embodiments of the present invention with reference to accompanying drawings.

Evidently, the embodiments described herein are illustrative in nature rather than exhaustive. All other embodiments, which can be derived by those skilled in the art from the embodiments given herein without any creative effort, shall fall within the protection scope of the present invention.

Figure 1:
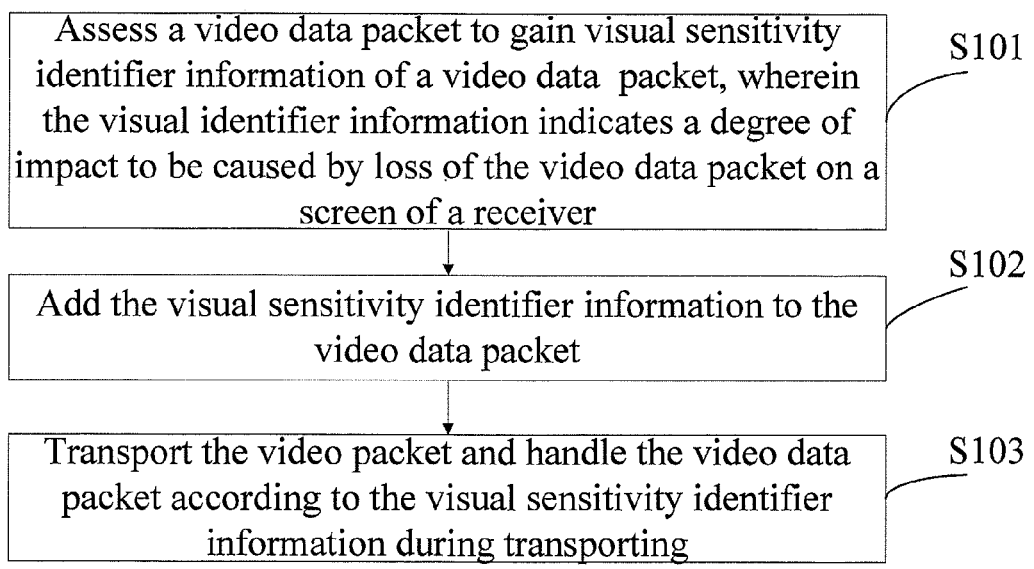
FIG. 1 is a flow chart of a method for transporting video streams in an embodiment of the present invention.

As shown in FIG. 1, a method for transporting video streams in an embodiment of the present invention includes the following steps:

S101. Assess a video data packet to gain visual sensitivity identifier information of the video data packet, where the visual sensitivity identifier information indicates a degree of impact to be caused by loss of the video data packet on a screen of a terminal.

S102. Add the visual sensitivity identifier information to the video data packet.

S103. Transport the video data packet and handle the video data packet according to the visual sensitivity identifier information during transport.

The details of assessing the video data packet are: assessing the video data packet according to motion vector of the video screen, frame type, position of the video data packet in the screen, chrominance, or luminance, or any combination thereof; and gaining the visual sensitivity identifier information of the video data packet according to the evaluation result. The visual sensitivity identifier information indicates the degree of impact caused by loss of the video data packet on the screen of the terminal. The video data packet may be assessed on the video source or an edge network device to gain the visual sensitivity identifier information of the video data packet.

In the method for transporting video streams herein, the video data packet is assessed to gain the visual sensitivity identifier information of the video data packet; the visual sensitivity identifier information is carried in the video data packet; while the video data packet is transported, the video data packet is handled differentially according to the identifier information. In this way, video streams of different coding mechanisms and different encapsulation mechanisms are handled intelligently according to the visual sensitivity while the video data packets are transported.

Figure 2:
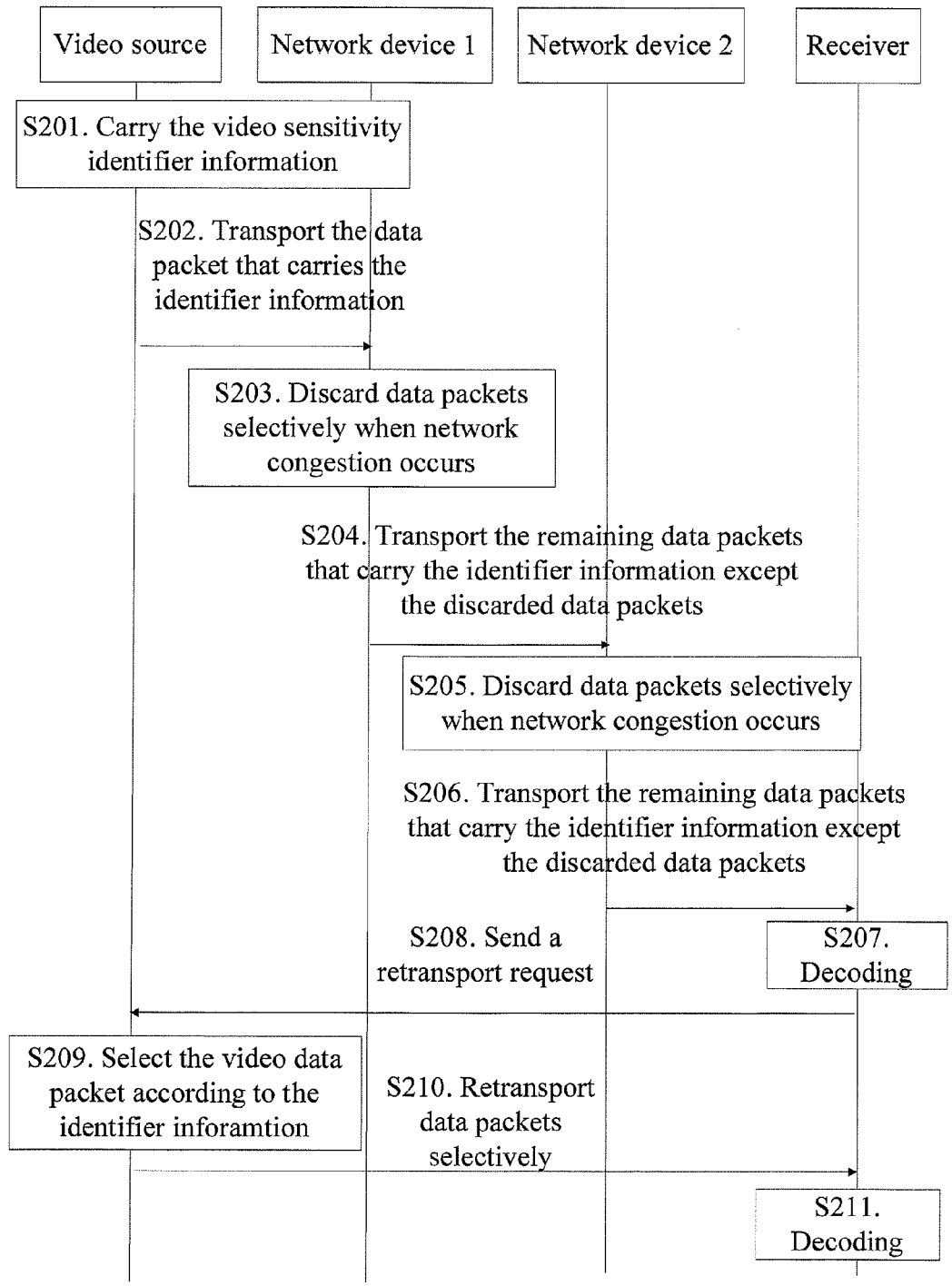
FIG. 2 is a flow chart of a method for transporting video streams in another embodiment of the present invention.
Figure 3:
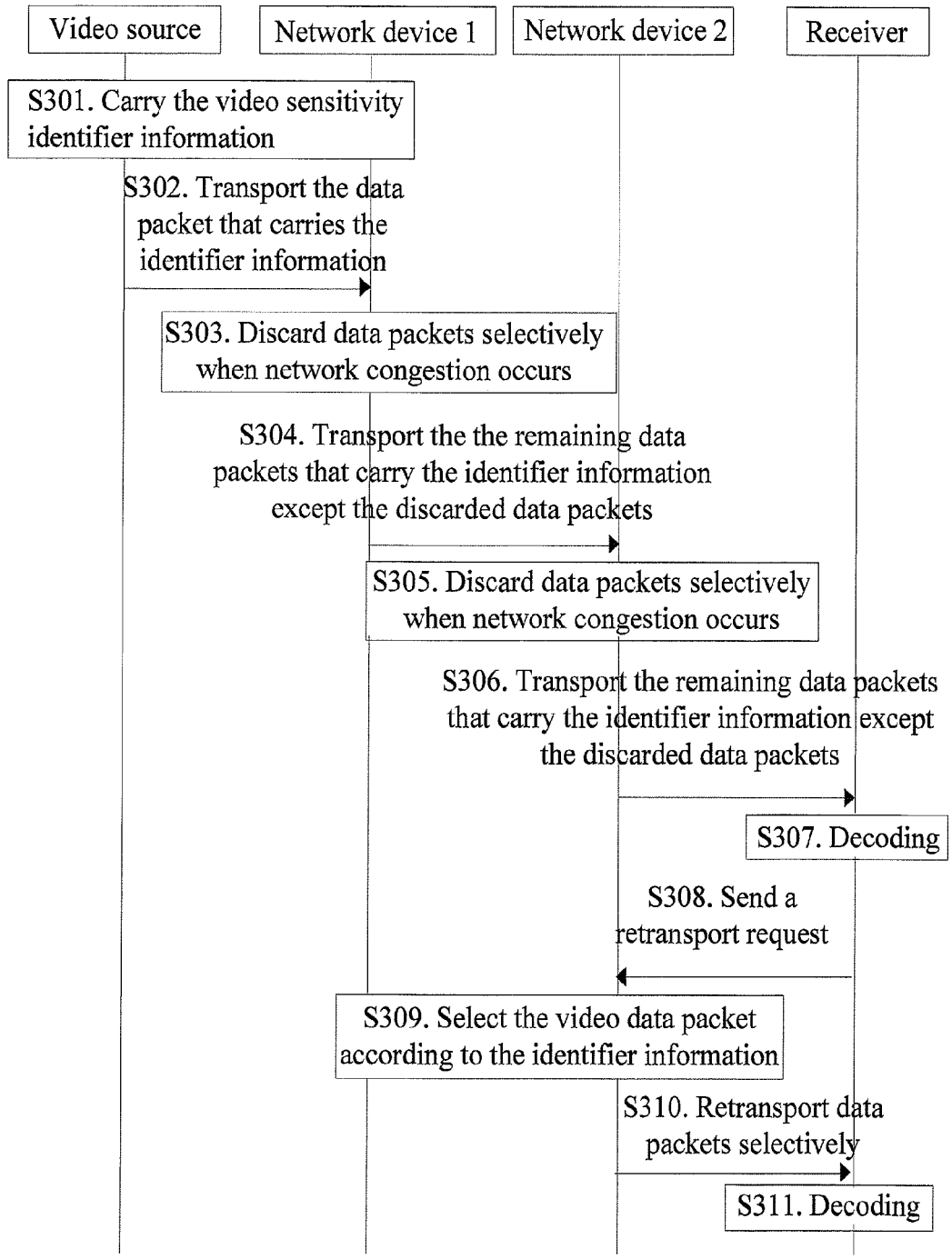
FIG. 3 is a flow chart of a method for transporting video streams in another embodiment of the present invention.

As shown in FIG. 2 and FIG. 3, a method for transporting video streams in another embodiment of the present invention includes the following steps:

S201. Assess visual sensitivity of each video data packet in the video stream one by one on the video source, and add the visual sensitivity identifier information to each video data packet.

The visual sensitivity identifier information indicates the degree of impact caused by loss of a video data packet on the screen of a terminal. The factors of the visual sensitivity include: motion vector of the video screen, frame type, position of the video data packet in the screen, chrominance, and luminance. The most important factor is the motion vector of the video screen, and the frame type is the second most important.

Without being limited to that, another detailed implementation mode is: assessing visual sensitivity of each video data packet in the video stream one by one on an edge network device near the video source, and adding the visual sensitivity identifier information of each video data packet into the video data packet. For example, the video source transports a data packet to the edge network device near the video source, and then the edge device gains the visual sensitivity identifier information of the data packet and adds the visual sensitivity identifier information to the video data packet.

Figure 4:
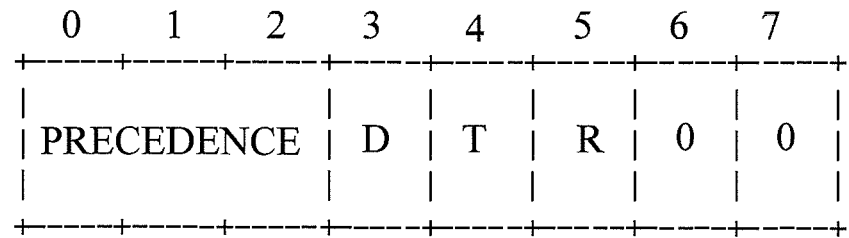
FIG. 4 shows a schematic diagram of how to carry identifier information in an embodiment of the present invention.

The visual sensitivity identifier information is carried in the video data packet in any of the following modes:

(1) As shown in FIG. 4, the identifier information may be carried in idle bits of a Type of Service (TOS) field in an IPv4 packet header or a Traffic Class (TC) field in an IPv6 packet header. The TOS field is a service type field of IPv4, and represents the same function as the TC field in the IPv6. After the visual sensitivity of the video data packet is assessed and quantitized, the visual sensitivity identifier information is added into the last two idle bits of the TOS field or the TC field. When a network node is congested, the network node chooses whether to discard a packet or not according to the visual sensitivity identifier information carried in such fields, which ensures a user's visual experience while relieving the congestion pressure. In the figure, bit 6 and bit 7 are idle.

Figure 5:
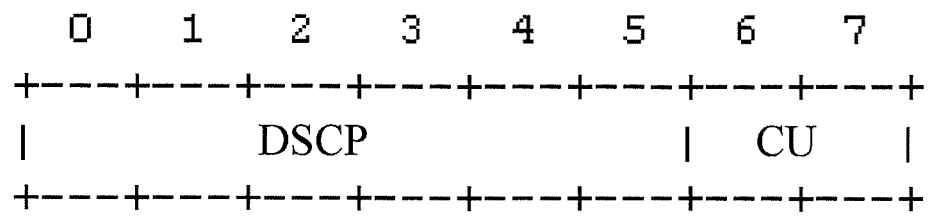
FIG. 5 shows a schematic diagram of how to carry identifier information in an embodiment of the present invention.

(2) As shown in FIG. 5, the visual sensitivity identifier information is carried in two idle bits in a Differentiated Services Code Point (DSCP) field. The visual sensitivity identifier information is carried in idle bits in the DSCP field of IPv4 or IPv6, for example, bit 6 and bit 7 of the DSCP field in FIG. 5.

DSCP is a criterion of classifying Quality of Service (QoS) put forward by the Internet Engineering Task Force (IETF). The DSCP makes use of the TOS field of IPv4 or the TC field of IPv6. Currently in such fields, only the six initial bits are occupied. Although defined in the latest congestion advertisement of the IETF, the last two bits are scarcely occupied by the network devices in the existing network, and are available for carrying the visual sensitivity identifier information.

Figure 6:
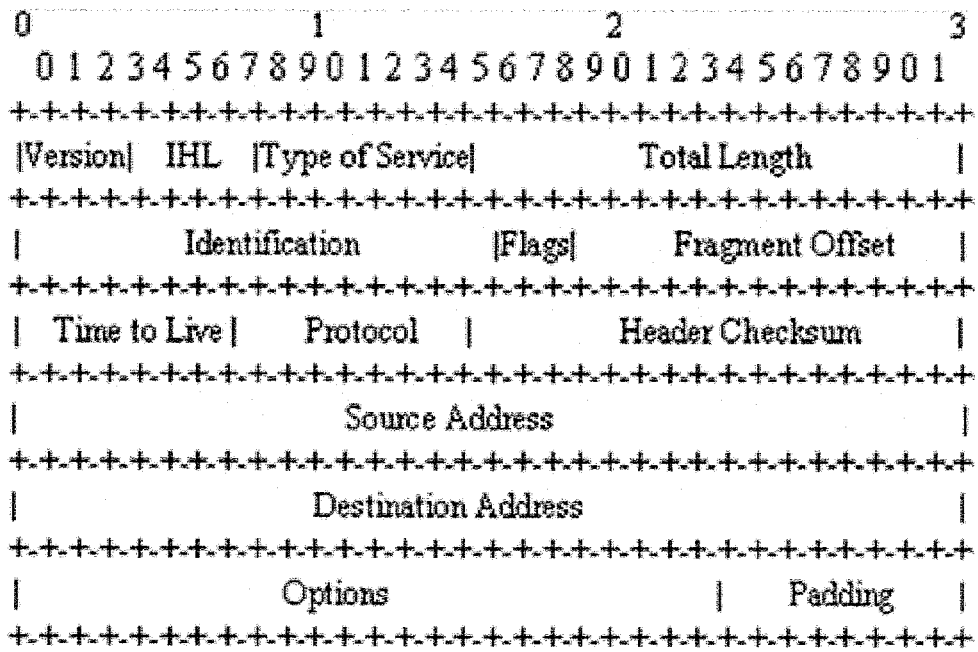
FIG. 6 shows a schematic diagram of how to carry identifier information in an embodiment of the present invention.

(3) As shown in FIG. 6, a new option header added in the IPv4 packet carries the visual sensitivity identifier information. A variable-length option field in the IPv4 packet header, that is, the options field in FIG. 6 may carry multiple option headers. A new option header may be defined, and the format of the new option header may be Tag-Length-Value (TLV) or another data format. The new option header carries the visual sensitivity identifier information. Any network node that supports the identifier information can discard packets selectively when network congestion occurs, or handle the packets in other differential modes. The content of this option header is defined flexibly, and new content (such as identifier information of video frames and video streams) may be added to the option header in subsequent video handling so that the function is applied in a wider scope.

Figure 7:
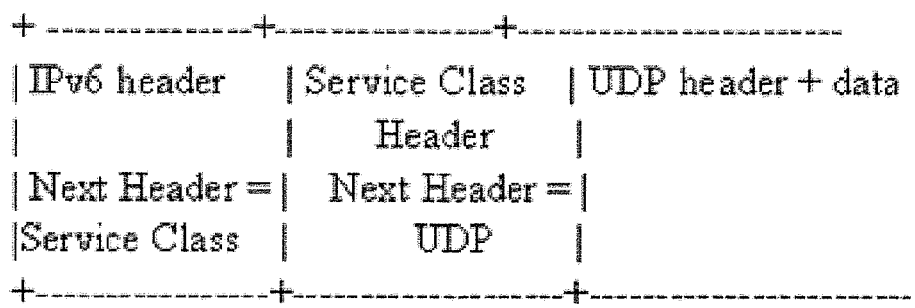
FIG. 7 shows a schematic diagram of how to carry identifier information in an embodiment of the present invention.

(4) As shown in FIG. 7, a new extension header defined in the IPv6 packet carries the visual sensitivity identifier information.

A service class ID extension header may include two parts: profile ID and profile content. Multiple profiles can be defined, and each profile is a class space. Duplicate codes are allowed for different profiles, but duplicate codes are not allowed for the same profile. A video application may exist as a profile, and other profiles may be defined as required to improve extensibility.

Specifically, a new IPv6 extension header is defined, whose type is Service Class. The new extension header carries the visual sensitivity identifier information. When the network node is congested, the network node checks types of the next extension headers of the IPv6 packet headers one by one. If the type of a next extension header is Service Class, the network node gains the content of the extension header, resolves the content to gain the visual sensitivity identifier information in the data packet, and discards the packet which has no or a little impact on the visual experience of the user according to the visual sensitivity identifier information, relieving the congestion pressure. Further, the network node may perform other differential service operations according to the visual sensitivity identifier information.

(5) As shown in FIG. 8, an extension header in an RTP packet carries the visual sensitivity identifier information.

The visual sensitivity identifier information in this embodiment may also be carried in an extension field of an RTP packet. As shown in FIG. 8, if bit X in the RTP packet header is set to 1, it indicates that the fixed header of the RTP packet is followed by only one extension header.

The extension header of the RTP packet may carry the visual sensitivity identifier information based on agreed information. Any device in the network capable of resolving the extension header can handle the video data packet differentially according to the identifier information when network congestion occurs.

S202. The data packet that carries the visual sensitivity identifier information is transported from the video source to a network device 1. The network device here refers to any node that supports network congestion management, for example, core network router, convergence network router, and so on.

S203. When network congestion occurs, the network device 1 discards the video data packet selectively according to the identifier information. Specifically, the network device 1 judges the visual sensitivity of the data packet according to the identifier information carried in the packet, and discards a packet of low visual sensitivity first. Besides, a visual sensitivity threshold may be set. If the visual sensitivity of a packet is lower than the threshold, the packet is discarded first. The network device may also make judgment according to a visual sensitivity threshold defined when the video source assesses the packet and gains the visual sensitivity identifier information. The selective discarding of video data packets based on the visual sensitivity identifier information is also known as intelligent discarding.

The intelligent discarding relieves the congestion pressure, and minimizes or eliminates impact caused by loss of packets on the user experience.

S204. The remaining data packets that carry the visual sensitivity identifier information except the discarded data packets are transported from the network device 1 to a network device 2.

S205. When network congestion occurs, the network device 2 discards the video data packets selectively according to the visual sensitivity identifier information. When network congestion occurs, the network device 2 discards the packet of low visual sensitivity first, thus relieving the congestion pressure and minimizing or eliminating impact caused by loss of packets on the user experience. The selective discarding of video data packets based on the visual sensitivity identifier information is also known as intelligent discarding.

It should be noted that S204 and S205 are optional, depending on the number of network devices in the network. If multiple network devices exist in the network and the network devices support the function of discarding video data packets selectively according to the visual sensitivity identifier information, the foregoing two steps are repeated. If the network device 1 is the only network device existent in the network, the foregoing two steps are skipped, and the procedure proceeds to the following steps directly.

S206. The remaining packets that carry the visual sensitivity identifier information except the discarded data packets are transported from the network device 2 to a decoder.

S207. The decoder decodes received video data packets.

S208. The decoder sends a retransport request.

Specifically, the decoder finds that certain packets are lost according to the decoding characteristics, and sends a retransport request to the video source. In this embodiment, the video source is a retransport server.

In other embodiments, the retransport server may be a network device capable of retransport. As shown in FIG. 3, the network device 2 serves as a retransport agent.

S209. The video source in FIG. 2 receives the retransport request, judges the visual sensitivity identifier information in packets requested for retransporting, and selects important packets of high visual sensitivity.

In other embodiments of the present invention, as shown in FIG. 3, the network device 2 capable of retransport captures the retransport request from the decoder, judges the visual sensitivity identifier information in the packets requested for retransporting, and retransports the packets of high visual sensitivity.

S210. In FIG. 2, the video source retransports the important packets gained in S209 to the decoder; in FIG. 3, the network device 2 retransports the important packets gained in S209 to the decoder.

S211. After receiving the retransported packets, the receiver decodes and plays the packets.

The foregoing steps have variations, and the order of the foregoing steps may change in the handle of transporting the video data packets. The method for transporting video streams in this embodiment may be implemented by a video source or a network device.

In the method for transporting video streams in this embodiment, when network congestion occurs, the visual sensitivity identifier information indicates how the video data packet is important to the visual sensitivity, and the network device discards the video data packets intelligently according to the visual sensitivity identifier information, or the lost video data packets requested for retransporting are retransported selectively according to the visual sensitivity identifier information. In this way, video streams of different coding mechanisms and different encapsulation mechanisms are handled intelligently according to the visual sensitivity. The technical solution in this embodiment is universally applicable to MPEG-2 coding format, H.264, and even VC-1 coding format, and MPEG2-TS encapsulation format and H.264 NAL-over-RTP encapsulation format.

The technical solution in this embodiment relieves the congestion pressure, and minimizes or eliminates impact caused by loss of packets on the user experience.

Persons of ordinary skill in the art should understand that all or part of the steps of the method provided in the embodiments above may be implemented by a program instructing relevant hardware. The program may be stored in computer readable storage media. When the program runs, the program executes the steps of the method specified in any embodiment above. The storage media may be a magnetic disk, CD-ROM, Read-Only Memory (ROM), or Random Access Memory (RAM).

A network device for transporting video streams is provided in another embodiment of the present invention to discard packets of video streams of different coding mechanisms and different encapsulation mechanisms according to visual sensitivity.

As shown in FIG. 9, a network device for transporting video streams in an embodiment of the present invention includes:

a gaining unit 100, configured to assess a video data packet to gain visual sensitivity identifier information of the video data packet, where the visual sensitivity identifier information indicates a degree of impact to be caused by loss of the video data packet on a screen of a terminal; specifically, assess a video data packet according to motion vector, frame type, position of the video data packet in the screen, chrominance, or luminance, or any combination thereof;

an adding unit 200, configured to add the visual sensitivity identifier information to the video data packet; specifically, add the visual sensitivity identifier information to a free field, an idle field, a new option header, or an extension header in the video data packet; and a transporting unit 300, configured to transport the video data packet and handle the video data packet according to the visual sensitivity identifier information during transport.

The network device for transporting video streams in this embodiment is applicable to a video source, or an edge network device, or other network devices.

In the network device for transporting video streams herein, the gaining unit assesses the video data packet to gain the visual sensitivity identifier information of the video data packet; the adding unit adds the visual sensitivity identifier information to the video data packet; and the transporting unit transports the video data packet and handles the video data packet differentially according to the identifier information during transport. In this way, video streams of different coding mechanisms and different encapsulation mechanisms are handled intelligently according to the visual sensitivity when network congestion occurs.

Figure 10:
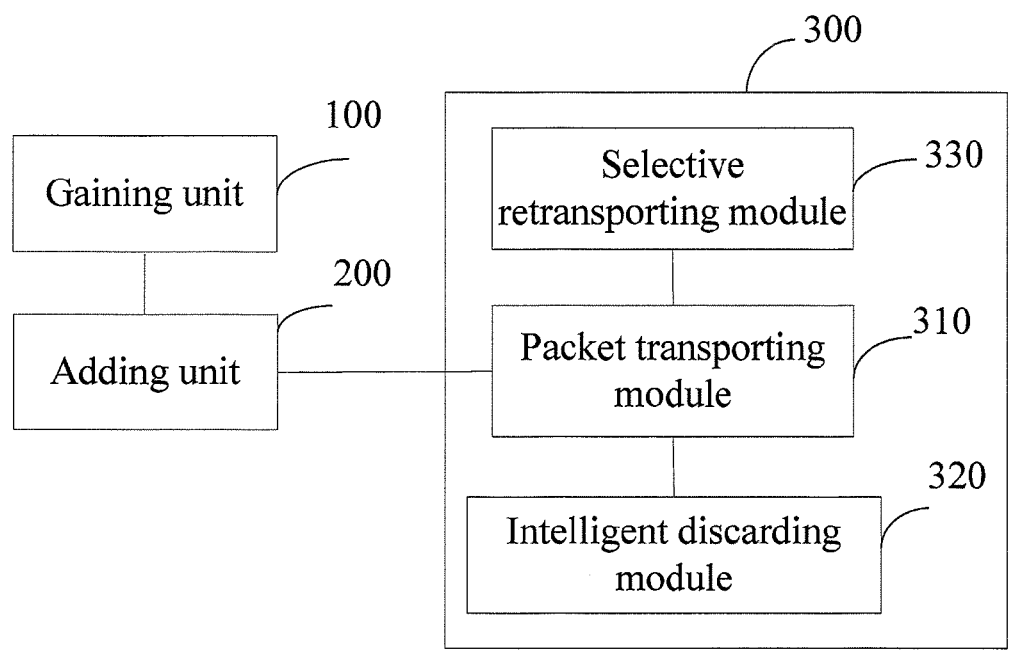
FIG. 10 shows a network device for transporting video streams in another embodiment of the present invention.

As shown in FIG. 10, a network device for transporting video streams in an exemplary embodiment of the present invention includes a gaining unit 100, an adding unit 200, and a transporting unit 300.

The gaining unit 100 is configured to assess a video data packet to gain visual sensitivity identifier information of the video data packet, where the visual sensitivity identifier information indicates a degree of impact to be caused by loss of the video data packet on a screen of a terminal.

The adding unit 200 is configured to add the visual sensitivity identifier information to the video data packet.

The gaining unit 100 and the adding unit 200 may be set on the video source, or set on the edge network device near the video source.

The transporting unit 300 includes a data packet transporting module 310, a discarding module 320, and a selective retransporting module 330.

The packet transporting module 310 is configured to transport video data packets.

The discarding module 320 is configured to selectively discard the video data packets transported by the packet transporting module 310 according to the visual sensitivity identifier information when network congestion occurs.

The discarding module 320 is generally set on a network device, for example, a network device 1 and a network device 2 shown in FIG. 2 and FIG. 3. Specifically, the discarding module 320 may discard the video data packets transported by the packet transporting module 310 and characterized by low visual sensitivity first according to the visual sensitivity identifier information when network congestion occurs.

The selective retransporting module 330 is configured to retransport video data packets selectively according to the visual sensitivity identifier information after receiving a retransport request while the packet transporting module transports the video data packets. The retransport request is generally sent by a decoder.

The selective retransporting module is generally set on a network device capable of retransporting video data packets, for example, video server and special network devices such as agent server. In this embodiment, the selective retransporting module 330 may be set on the network device 2 shown in FIG. 3, or set on the video source shown in FIG. 2.

The network device for transporting video streams in this embodiment may include only the discarding module 320 or the retransporting module 330. The network device for transporting video streams in this embodiment is applicable to the video source.

In the network device for transporting video streams in this embodiment, the gaining unit assesses the video data packet to gain the visual sensitivity identifier information of the video data packet; the adding unit adds the visual sensitivity identifier information to each corresponding video data packet. If network congestion occurs in the transport handle, the network device selectively discards the packets that carry different identifier information. When receiving a retransport request, the network device retransports video data packets selectively according to the visual sensitivity identifier information. In this way, video streams of different coding mechanisms and different encapsulation mechanisms are handled differentially according to the visual sensitivity.

The technical solution in this embodiment is universally applicable to MPEG-2 coding format, H.264, and even VC-1 coding format, and MPEG2-TS encapsulation format and H.264 NAL-over-RTP encapsulation format.

The technical solution in this embodiment relieves the congestion pressure, and minimizes or eliminates impact caused by loss of packets on the user experience.

A system for transporting video streams in an embodiment of the present invention includes a video source and a network device.

The video source is configured to assess a video data packet to gain visual sensitivity identifier information of the video data packet, add the visual sensitivity identifier information to the video data packet of the video stream, and transport the video data packet to a network device. See the video source shown in FIG. 2.

The network device is configured to receive the video data packet from the video source, and handle the video data packet according to the visual sensitivity identifier information, where the visual sensitivity identifier information indicates a degree of impact to be caused by loss of the video data packet on a screen of a terminal. The network device includes a first network device and a second network device.

The first network device is configured to receive the video data packet, and handle the video data packet according to the visual sensitivity identifier information (see network device 1 in FIG. 2); and The second network device is configured to receive the video data packet, and selectively retransport the video data packet requested for retransporting according to the visual sensitivity identifier information after receiving a retransport request (see network device 2 in FIG. 3).

The first network device or the second network device may also be configured alone. More than one first network device may exist. In this case, video data packets are discarded selectively according to the visual sensitivity identifier information repeatedly when the data stream is transported. The second network device may be set before the first network device.

In an exemplary embodiment of the present invention, the video source may selectively retransport the video data packet requested for retransporting according to the visual sensitivity identifier information after receiving a retransport request (see the video source in FIG. 2).

Another system for transporting video streams in an embodiment of the present invention includes a video source and a network device.

The video source is configured to transport a video data packet to a network device; and The network device is configured to: receive the video data packet from the video source, assess the video data packet to gain visual sensitivity identifier information of the video data packet, add the visual sensitivity identifier information to the video data packet, and handle the video data packet according to the visual sensitivity identifier information, where the visual sensitivity identifier information indicates a degree of impact to be caused by loss of the video data packet on a screen of a terminal.

The network device includes a first network device and a second network device.

The first network device is configured to receive the video data packet, assess the video data packet to gain the visual sensitivity identifier information of the video data packet, and add the visual sensitivity identifier information to the video data packet of the video stream. In an exemplary embodiment of the present invention, the first network device is further configured to discard the video data packets selectively according to the visual sensitivity identifier information. More than one first network device may exist.

The second network device is configured to receive the video data packet, and selectively retransport the video data packet requested for retransporting according to the visual sensitivity identifier information after receiving a retransport request.

In another exemplary embodiment of the present invention, the video source may be configured to selectively retransport the video data packet requested for retransporting according to the visual sensitivity identifier information after receiving a retransport request.

In the system for transporting video streams in this embodiment, the video source and the network device are set so that video streams of different coding mechanisms and different encapsulation mechanisms are handled intelligently according to the visual sensitivity. The video source or the network device gains the visual sensitivity identifier information, and adds the identifier information to the video data packet; the network device discards video data packets selectively according to the identifier information; the network device or video source retransports the packets selectively according to the identifier information. In this way, video data packets of different coding mechanisms and different encapsulation mechanisms are handled intelligently, and impact on a screen of a receiver is minimized or eliminated.

The above descriptions are merely exemplary embodiments of the present invention, but not intended to limit the scope of the present invention. Any modifications, variations or replacement that can be easily derived by those skilled in the art shall fall within the protection scope of the present invention. Therefore, the protection scope of the present invention is subject to the appended claims.

What is claimed is:

1. In a network device, a method for transporting video streams, the method comprising:
   receiving a video data packet, wherein a packet header of the video data packet contains visual sensitivity identifier information, the visual sensitivity identifier information indicates a degree of impact to be caused by loss of the video data packet on a screen of a terminal; and
   when network congestion occurs, determining, according to the visual sensitivity identifier information in the packet header, a visual sensitivity of the video data packet is lower than a visual sensitivity threshold, and discarding the video data packet.

2. The method for transporting video streams according to claim 1, wherein:
   the visual sensitivity identifier information is in one of the following of the packet header: a free field, an idle field, a new option header, or an extension header; where
   the free field or the idle field comprises one of: two idle bits in a Type of Service (TOS) field of Internet Protocol version 4 (IPv4) packet header; two idle bits in a Traffic Class (TC) field of Internet Protocol version 6 (IPv6) packet header; or two idle bits in a Differentiated Services Code Point (DSCP) field of IPv4 packet header or IPv6 packet header;
   the new option header comprises: a new option header of IPv4 packet header; and
   the new extension header comprises: a new extension header of IPv6 packet header; or a new extension header of Real-time Transport Protocol (RTP) packet header.

3. The method for transporting video streams according to claim 1, further comprising:
   when receiving a retransport request for the video data packet, determining according to the visual sensitivity identifier information in the packet header, the video data packet is of high visual sensitivity, and retransporting the video data packet.

4. The method for transporting video streams according to claim 1, wherein:
   the visual sensitivity identifier information is gained by assessing the video data packet according to motion vector, frame type, position of the video data packet in a screen, chrominance, or luminance, or any combination thereof.

5. A system for transporting video streams, the system comprising:
   a video source, configured to: assess a video data packet to gain visual sensitivity identifier information of the video data packet, add the visual sensitivity identifier information to a packet header of the video data packet, and transport the video data packet to a network device, wherein the visual sensitivity identifier information indicates a degree of impact to be caused by loss of the video data packet on a screen of a terminal; and
   a network device, configured to receive the video data packet from the video source, and when network congestion occurs, determine according to the visual sensitivity identifier information in the packet header, a visual sensitivity of the video data packet is lower than a visual sensitivity threshold, and discard the video data packet.

6. The system for transporting video streams according to claim 5, wherein the network device is further
   configured to when receiving a retransport request for the video data packet, determine according to the visual sensitivity identifier information in the packet header, the video data packet is of high visual sensitivity, and retransport the video data packet.

7. The system for transporting video streams according to claim 5, wherein:
   the video source is further configured to, when receiving a retransport request for the video data packet, determine according to the visual sensitivity identifier information, the video data packet is of high visual sensitivity, and retransport the video data packet.

8. A computer program product for use in a network device, the computer program product being stored on a non-transitory computer readable medium and including computer executable instructions that when executed by processor cause the network device to perform the following:
   receiving a video data packet, wherein a packet header of the video data packet contains visual sensitivity identifier information, the visual sensitivity identifier information indicates a degree of impact to be caused by loss of the video data packet on a screen of a terminal; and
   when network congestion occurs, determining, according to the visual sensitivity identifier information, visual sensitivity of the video data packet is lower than a visual sensitivity threshold, and discarding the video data packet.

* * * * *